Patented Aug. 27, 1940

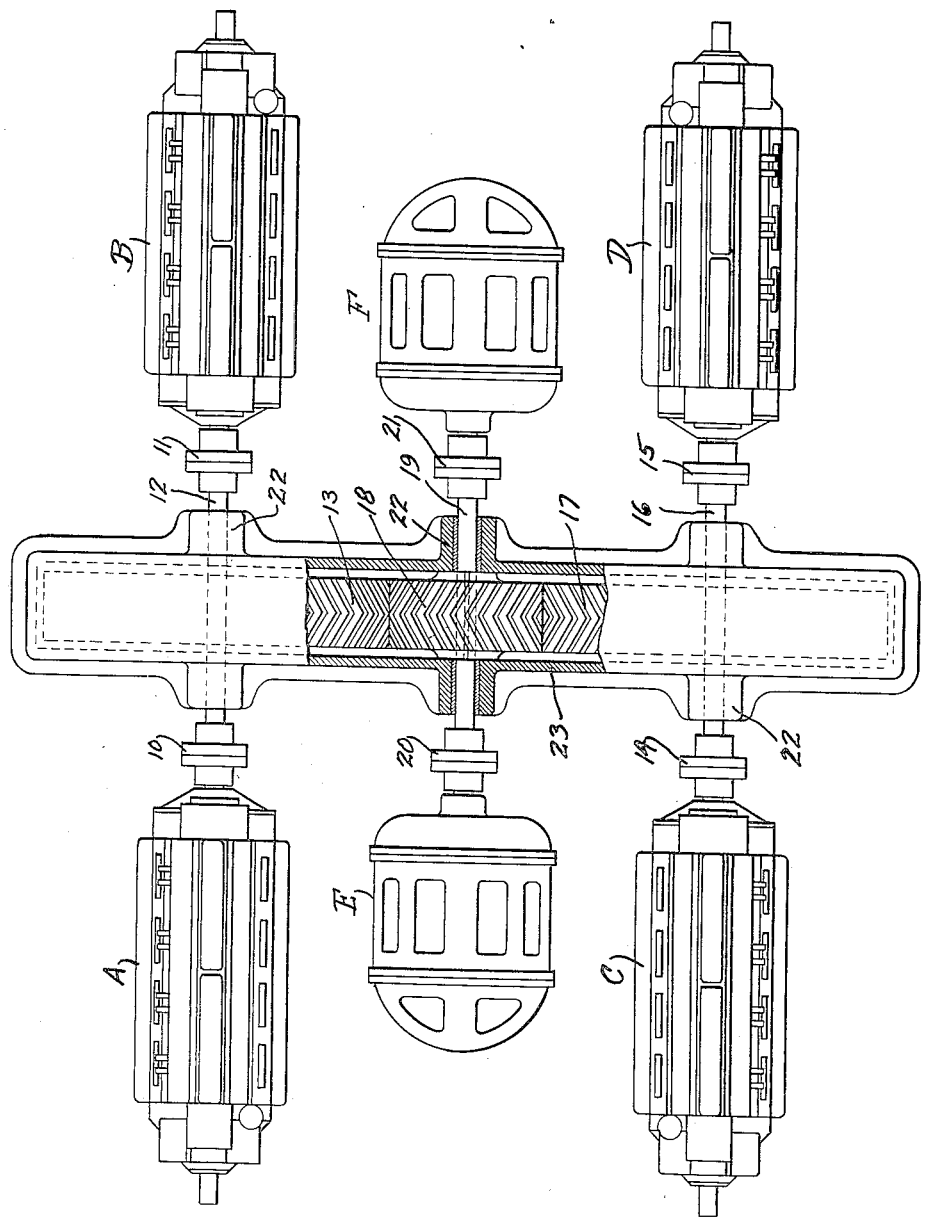

2,213,045

UNITED STATES PATENT OFFICE 2,213,045

POWER ASSEMBLY

Austin Kuhns, Buffalo, N. Y., assignor to Farrel-Birmingham Company, Incorporated, Buffalo, N. Y., a corporation of Connecticut Application March 24, 1939, Serial No. 263,939

2 Claims. (Cl. 290—4)

This invention relates to a power assembly of particular advantage and utility in the driving of a number of alternating current generators by a number of power sources such as Diesel engines.

Where a number of alternating generators are to be driven by the combined power of a number of driving units, such as Diesel engines, it is very important that the speeds of the engines be synchronized so that the generators driven thereby will be synchronously driven without any out of phase condition arising. Whereas, the speed of the engines can be synchronized with sufficient closeness by governors under normal operating conditions, it is impossible, or at least impractical, to rely on such governor control for synchronization under abnormal operation conditions as where generators are to be synchronously driven. The important object of my invention is therefore to provide a simple assembly of the driving units and the generators and interconnecting driving means.

In accordance with my invention, I interconnect the driving engines by gearing which includes a driven gear to which the generators to be driven are rigidly connected, so that the engines will operate at synchronous speeds and the generators will be driven at synchronous speeds without any out of phase conditions.

My improved assembly is shown more or less diagrammatically by the figure on the accompanying drawing. On this drawing are shown two sets of driving sources such as Diesel engines A, B and C, D. The shafts of the engines A and B are mechanically connected as by couplings 10 and 11, with the ends of a shaft 12 to which a drive gear 13 is secured. The shafts of the engines C and D are connected, as by couplings 14 and 15 with the shaft 16 to which a gear 17 is secured, the gears 13 and 17 being of the same size. The engines of the pairs face each other and the gears 13 and 17 are in axial alignment and are meshed by a driven pinion 18 secured on a shaft 19, this shaft being mechanically connected, as by couplings 20 and 21, with the shafts of alternating current generators E and F. The gear and pinion shafts are suitably journaled in bearing structures 22 on a supporting frame 23 which may also form an enclosure for the gears.

With the solid mechanical connections of the engines with their respective gears and the connection of the gears by the pinion, the engines will have to operate with synchronous speed, and the generators which are mechanically solidly connected with the pinions will have to run at synchronous speed and in phase at all times. By proper dimensioning of the driven pinion relative to the driving gears the generators may be driven at any desired speed. Any type of gearing may be used, the herring bone type of gearing being shown.

Speed governors may be provided for the individual engines so that they may tend to run as closely as possible at synchronous speeds, for full speed synchronization thereof by the mechanical interconnection thereof by the gearing.

Having described my invention, I claim as follows:

1. In a power assembly, a pair of Diesel engines of like capacity and axially aligned, a shaft between and rigidly secured to the power shafts of said engines, a gear on said connecting shaft, a pinion meshing said gear and a supporting shaft therefor, and a pair of alternating current generators of like capacity axially aligned and each rigidly secured to one end of said pinion shaft whereby balanced synchronous speed of said engines will result and synchronous speed of said generators.

2. In a power assembly, a driven gear, a supporting shaft therefor, a pair of alternating current generators of like capacity each rigidly secured to one end of said driven gear shaft, a pair of driving gears at opposite sides of said driven gear and meshing therewith, a supporting shaft for each driving gear, a pair of Diesel engines of like capacity in axial alignment and rigidly secured to the opposite ends of each of said driving gear shafts whereby said engines will operate with balanced synchronous speed and said generators will be synchronously driven.

AUSTIN KUHNS.